United States Patent [19]

Claffey et al.

[11] Patent Number: 6,102,334

[45] Date of Patent: Aug. 15, 2000

[54] METHOD AND APPARATUS FOR DETERMINING CLOSE APPROACHES FOR EARTH-FIXED LAUNCH TRAJECTORIES

[75] Inventors: Douglas Claffey, Malvern; James Woodburn, King of Prussia, both of Pa.

[73] Assignee: Analytical Graphics, Inc., Malvern, Pa.

[21] Appl. No.: 09/031,800

[22] Filed: Feb. 27, 1998

[51] Int. Cl.[7] .................................................. B64G 1/10
[52] U.S. Cl. ...................................... 244/158 R; 244/176
[58] Field of Search .............................. 244/150 R, 172, 244/176; 701/13

[56] References Cited

U.S. PATENT DOCUMENTS

| | | | |
|---|---|---|---|
| 5,193,766 | 3/1993 | Kawano et al. | 244/161 |
| 5,242,135 | 9/1993 | Scott | 244/158 R |
| 5,299,764 | 4/1994 | Scott | 244/161 |
| 5,504,492 | 4/1996 | Class et al. | 342/357 |
| 5,806,802 | 9/1998 | Scott | 244/161 |
| 5,862,495 | 1/1999 | Small et al. | 701/13 |
| 5,910,788 | 6/1999 | Class | 701/214 |
| 5,914,685 | 6/1999 | Kozlov et al. | 701/215 |

OTHER PUBLICATIONS

Rudolf Meyer, Elements of Space Technology for Aerospace Engineers, Academic Press, pp 181–212, 1999.

Woodburn & Dichmann. 1997. "Determination of Close Approaches for Constellations of Satellites." Paper No. C–5, IAF International Workshop on Mission Design and Implementation of Satellite Constellations; Toulouse, France; Nov.

Jenkins & Schumacher. 1997. "Predicting Conjunctions with Trackable Space Debris: Some Recent Experiences." Paper No. 97–014, 20th Annual AAS Guidance and Control Conference; Breckenridge, Colorado; Feb. 5–9.

Healy. 1995. "Close Conjunction Detection on Parallel Computer." *J. Guidance, Control & Dynamics* 18(4): 824–829; Jul.–Aug.

Alfano. 1994. "Determining Satellite Close Approaches, Part II." *J. Astronaut. Sci.* 42(2): 143–152; Apr.–Jun.

Alfano & Negron, Jr. 1993. "Determining Satellite Close Approaches." *J. Astronaut. Sci.* 41(2): 217–225; Apr.–Jun.

Hoots, Crawford & Roehrich. 1984. "An Analytical Method to Determine Future Close Approaches Between Satellites." *Celestial Mechanics* 33: 143–158.

Beerer & Bauer. 1983. "Determination of Closest Approach and Duration of Encounter for Two Satellites in Circular Non–Coplanar Orbits." Paper No. 83–336, AAS/AIAA Astrodynamics Conference; Lake Placid, New York; Aug. 22–25; pp. 335–343.

*Primary Examiner*—Galen L. Barefoot
*Attorney, Agent, or Firm*—Roberts Abokhair & Mardula, LLC

[57] ABSTRACT

Determining suitable launch windows to avoid or minimize close approaches between a launch vehicle and orbiting objects. A method and apparatus is disclosed for minimizing close approaches between spacecraft and other objects in space during the launch and early deployment phase of their lifetime, by defining a launch window, utilizing filters to screen certain objects in space from consideration and identifying launch window blackout times to avoid close approaches with the remaining objects in space under consideration.

26 Claims, 6 Drawing Sheets

Q REPORT: SOUNDING ROCKET-LAUNCH WINDOW BLACKOUTS

01 FEB 1998 16:14:68

MISSILE-SOUNDINGROCKET

CLOSE APPROACH DEFINITION

CLOSE APPROACH PRIMARY VEHICLE: SOUNDING ROCKET
CLOSE APPROACH RANGE THRESHOLD: 20.000000 (KM)
CLOSE APPROACH TIME INTERVAL: 25 JAN 1998 00:00:00.00 TO 25 JAN 1998 00:20:56.73
LAUNCH WINDOW INTERAVAL: 1 JUL 1998 00:00:00.00 TO 1 JUL 1998 00:10:00.00

| OBJECT NAME | BLACKOUT START TIME (UTCG) | BLACKOUT END TIME (UTCG) | BLACKOUT DURATION (SEC) |
|---|---|---|---|
| DEBRIS-20868 | 25 JAN 1998 00:02:22.40 | 25 JAN 1998 00:02:53.76 | 31.37 |
| DEBRIS-17617 | 25 JAN 1998 00:05:07.49 | 25 JAN 1998 00:05:24.97 | 17.55 |
| DEBRIS-22359 | 25 JAN 1998 00:06:23.31 | 25 JAN 1998 00:06:29.56 | 6.24 |
| DEBRIS-23275 | 25 JAN 1998 00:08:31.32 | 25 JAN 1998 00:08:45.05 | 13.83 |

*FIG. 10*

METHOD AND APPARATUS FOR DETERMINING CLOSE APPROACHES FOR EARTH-FIXED LAUNCH TRAJECTORIES

FIELD OF THE INVENTION

The present invention relates generally to space mission planning, especially the launching of missiles and vehicles for delivering satellites and other payloads into space. In particular, the present invention relates to a solution for the problem of determining suitable launch windows to avoid or minimize close approaches between, on the one hand, a missile or launch vehicle, and, on the other hand, satellites and other objects in orbit around the Earth.

BACKGROUND OF THE INVENTION

As the number of objects in orbit about the Earth increases, the determination of close approaches between objects is becoming an increasingly important aspect of satellite operations. A recent study by Jenkins, E. L. and Schumacher, P. W., entitled "Predicting Conjunctions with Trackable Space Debris: Some Recent Experience," was presented at the Twentieth Annual AAS Guidance and Control Conference in Breckenridge, Colo. in February 1997 and indicated the growing importance of close approach prediction for the Shuttle and the Mir space station. The basic problem is to determine when two objects will have a conjunction where the risk of collision is unacceptably large. There are many ways of defining what constitutes risk. These definitions range in complexity from the specification of a minimum allowable separation distance between the two objects to using complex probability density functions to determine the statistical probability of collision during a conjunction.

Prior studies of the close approach problem have focused on the situation where both objects are assumed to be in orbit about the Earth where the nominal ephemeris of both objects is known and no propulsive forces are being applied. The method of locating close approaches to the primary object typically entails using a set of filters in order of increasing computational burden to eliminate objects which are candidates for close approaches from consideration. The source of data which defines the orbital elements of the tracked objects in orbit about the Earth is the space catalogue maintained by the United States Space Command. One example of this method involves a series of three filters through which candidate objects have to pass before a final determination of the close approach distance is made. One of the filters is purely geometrical and two utilize known properties of the orbital motion of the two objects. These filters serve to "weed out" the majority of the objects in the catalogue and reduce the number of computations needed. After the application of the filters, the trajectories of the remaining candidate objects are sampled to determine the actual close approach periods. The exclusion zone is modeled as a sphere centered at the primary satellite. A special adaptation of the algorithms used in this method has been developed to allow for efficient predictions of close approaches for satellite constellations.

Another method involves a technique for modeling the distance between two objects using localized cubic polynomials. In this approach, the geometrical filter and first orbital motion dependent filter used in the previously described method are still applied but the final filter, referred to as the time filter, is removed. The trajectories of the vehicles are then sampled at large time steps (up to 10 minutes) to create waveforms describing either the relative distance or range rate between the satellites. This waveform provides a model from which estimates of the time of closest approach and the entrance and exit times for crossing an exclusion zone boundary are made. A variant of this method allows the exclusion zone boundary to be modeled as an ellipsoid centered at the primary satellite to account for uncertainties in the along-track position of the objects being greater than the uncertainty in the cross-track and radial directions. Other authors have approached restricted versions of the problem considering only the distance between the orbital paths or only circular orbits.

The detection of close approaches to satellites during the launch and early post-deployment phase of their lifetimes is an important subset of the overall problem. Potential collisions during this period can usually be avoided by adjusting the time of launch. Standard close approach detection methods cannot be applied since most of the assumptions made in satellite to satellite close approach algorithms are violated when launch trajectories are considered. First, the trajectory of the launch vehicle is heavily influenced by thrusting. As a result, any filters that depend on an assumption of orbital motion cannot be used. Second, the launch time is typically restricted to be within a launch window, but the exact time of launch is not known prior to liftoff. This complication is even more troublesome than the first, since in this case the position of the primary object is not uniquely defined at a given point in time.

One approach to solving the close approach problem for a launch vehicle is to generate the trajectory of the launch vehicle based on possible launch times throughout the launch window. Each of these trajectories can then be analyzed for close approaches and the results accumulated. This process can be very time consuming since the time steps through the launch window must be extremely small to account for the short duration of the conjunctions.

To overcome the shortcomings of approaches used to date, a method and apparatus are needed that will determine close approaches based on a launch time anywhere within a given launch window and mark off corresponding blackout times during that launch window in a small number of runs without concern for the sampling frequency.

SUMMARY OF THE INVENTION

It is therefore an object of the present invention to provide a method and apparatus for determining close approaches between spacecraft and other objects in space.

It is a further object of the present invention to provide a method and apparatus for determining close approaches between spacecraft and other objects in space, utilizing one or more filters to eliminate from consideration objects that are candidates for close approaches.

It is a further object of the present invention to provide a method and apparatus for determining close approaches between spacecraft and other objects in space during the launch and early post-deployment phase of their lifetimes.

It is a further object of the present invention to provide a method and apparatus for determining close approaches between spacecraft and other objects in space during the launch and early post-deployment phase of their lifetimes, by defining a launch window; i.e., a time frame during which the launch must begin, and identifying corresponding blackout times during that launch window in a small number of runs.

It is a further object of the present invention to provide a method and apparatus for determining close approaches between spacecraft and other objects in space during the launch and early post-deployment phase of their lifetimes, by defining a launch window; i.e., a time frame during which the launch must begin, and identifying corresponding blackout times during that launch window in a single run.

It is a further object of the present invention to provide a method and apparatus for determining close approaches between spacecraft and other objects in space during the launch and early post-deployment phase of their lifetimes, by defining a launch window; i.e., a time frame during which the launch must begin, and identifying corresponding blackout times during that launch window in a single run, maintaining the ephemeris of the reference vehicle in the Earth-Centered Earth-Fixed (ECEF) reference frame.

It is a further object of the present invention to provide a method and apparatus for determining close approaches between spacecraft and other objects in space during the launch and early post-deployment phase of their lifetimes, by defining a launch window; i.e., a time frame during which the launch must begin, and identifying corresponding blackout times during that launch window in a single run, maintaining the ephemeris of the reference vehicle in the ECEF reference frame and utilizing a computer program for satellite system analysis that computes close approaches on the basis of satellite databases and user input regarding the trajectory of the reference vehicle and other parameters.

A method and apparatus for determining close approaches for Earth fixed launch trajectories in accordance with the present invention would assume that the launch trajectory of the reference vehicle is known in the ECEF reference frame. Building upon an existing computer program for satellite system analysis, this method would allow the user to enter trajectory data for a missile or launch vehicle, set other criteria (such as an acceptable range between the reference vehicle and other objects in space) and specify the beginning and end times for the launch window. Drawing upon its satellite databases and the trajectory parameters and other data entered by the user, the program would calculate close approaches for all possible launch times within the window in a single run, thereby allowing a decision to launch or not to launch to be made.

BRIEF DESCRIPTION OF THE DRAWINGS

FIG. 10 illustrates a computer generated launch window blackouts report.

BRIEF DESCRIPTION OF THE INVENTION

Figure 1:
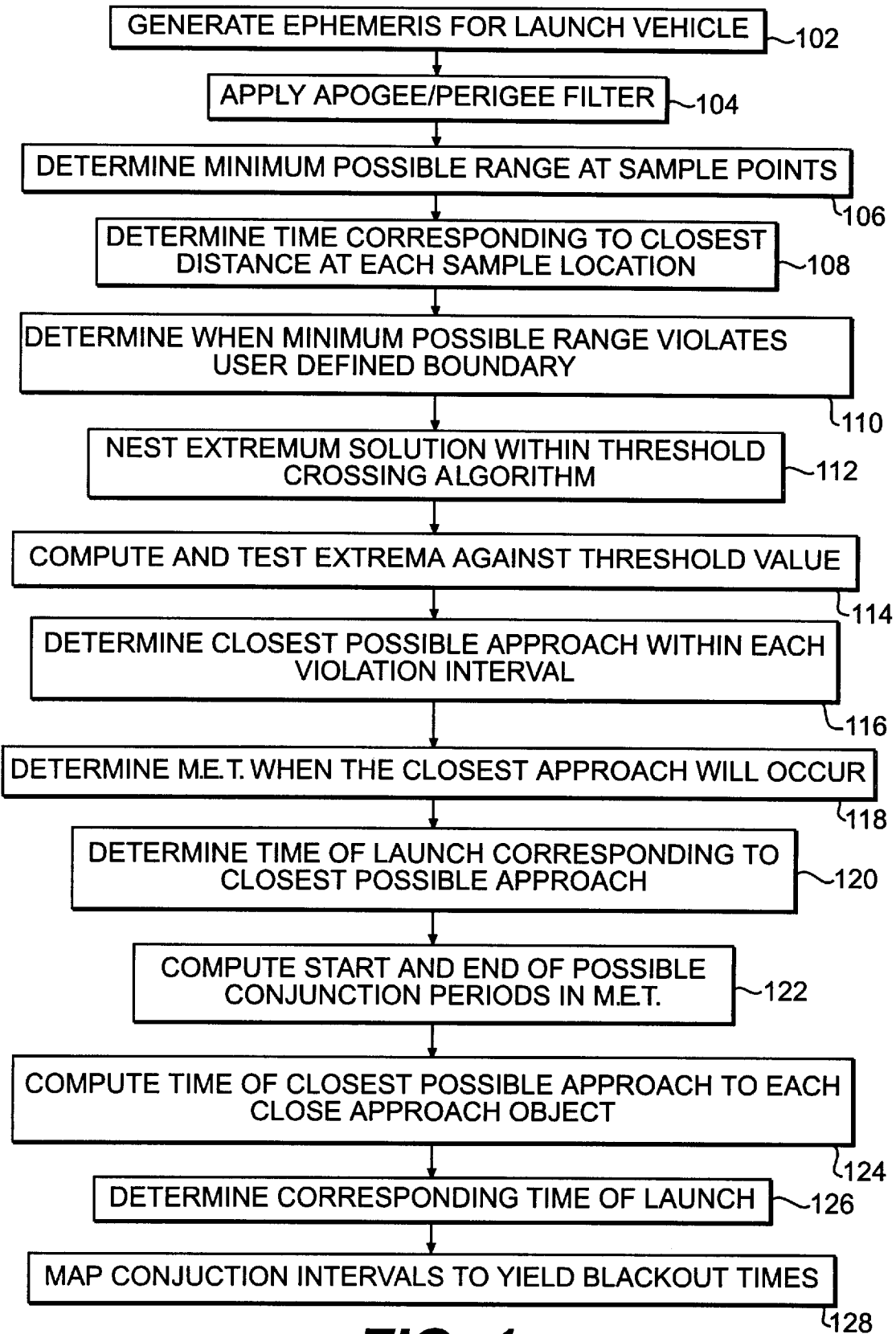
FIG. 1 illustrates the practice of the present invention.

FIG. 1 depicts the practice of the present invention. The method that is the subject of the present invention begins with the generation of an ephemeris for the launch vehicle 102. This ephemeris is maintained in the Earth-Centered Earth-Fixed (ECEF) reference frame with the time stored as seconds after launch. This time reference will be referred to as Mission Elapsed Time (MET). The ephemeris of the launch vehicle may, therefore, be held fixed regardless of the launch time. The generated ephemeris is assumed to start from the surface of the Earth and will reach some maximum radius during the span of the generated ephemeris. Since this maximum radius is independent of the time of launch, an apogee/perigee filter can be applied 104. The application of this filter removes candidate objects from consideration which do not come within the maximum close approach distance of having an altitude overlap with the launch vehicle.

The next step in the process is to find the "minimum possible range" between the launch vehicle and the remaining candidate objects at sampled points along the nominal launch vehicle trajectory 106. Each sample point corresponds to a unique MET. The actual time of launch could be any time within the launch window. The minimum possible range is computed by sampling the range between the launch vehicle and the candidate object, where the position of the candidate object is computed in the ECEF coordinate system based on a small set of launch times throughout the launch window.

These sample launch times must include the end points of the launch window and several points in between. A simple extremum solution algorithm is then used to determine the time within the launch window that corresponds to the closest distance between the target and candidate objects at each sample location 108.

This method of sampling imposes a constraint on the use of this approach in that the launch window under consideration cannot be longer in duration than the shortest of the orbital periods of the candidate objects. If the launch window were longer than the orbital period of a candidate object, then it is possible that two minima could occur during the launch window.

The sampled values of the minimum possible range are subjected to a threshold-crossing detection algorithm to determine when the minimum possible range violates a user defined boundary 110. The solutions of this process represent intervals in MET when a close approach could occur dependent upon the time of launch. It is very important that the threshold crossing algorithm be able to detect the possibility of crossing pairs between sampled points. This is necessary since the close approach periods may be much smaller than the sampling rate. A simple way to detect this type of crossing is to nest the extremum solution within the threshold crossing algorithm 112.

Extrema are computed and tested against the threshold value when the slope of the minimum possible range between the two objects with respect to the MET changes from negative to positive 114.

The lowest value of the minimum possible range, the closest possible approach, is then determined within each violation interval 116. This process can be accomplished during the threshold crossing detection or can be performed separately if a normal sample point was below the threshold value. The solution for the lowest value of the minimum possible range also yields the MET when the closest approach will occur 118. Since the trajectory of the launch vehicle is referenced to the time of launch, the MET of the closest possible approach is simply the independent variable portion of the extremum solution. The time of launch that corresponds to the closest possible approach is then determined 120.

The solution process for the minimum possible range involves the computation of the time within the launch window which corresponds to the minimum range between the two objects.

The process described above determines which objects in the space catalogue can have close approaches with the launch vehicle. The start and end of the possible conjunction periods are computed in MET 122, with a conjunction referring to a period of time when the two objects are unacceptably close. The time of the closest possible approach to each close approach object is computed in MET 124 and is then mapped back into the launch window to give the corresponding time of launch 126. To complete the picture, the conjunction intervals are mapped back to the launch window to yield blackout periods 128. The blackout periods correspond to launch times that would result in unacceptable conjunctions between the launch vehicle and other orbiting objects. Based upon the calculations, program managers can then decide which launch windows are candidates for satellite launch.

Figure 2:
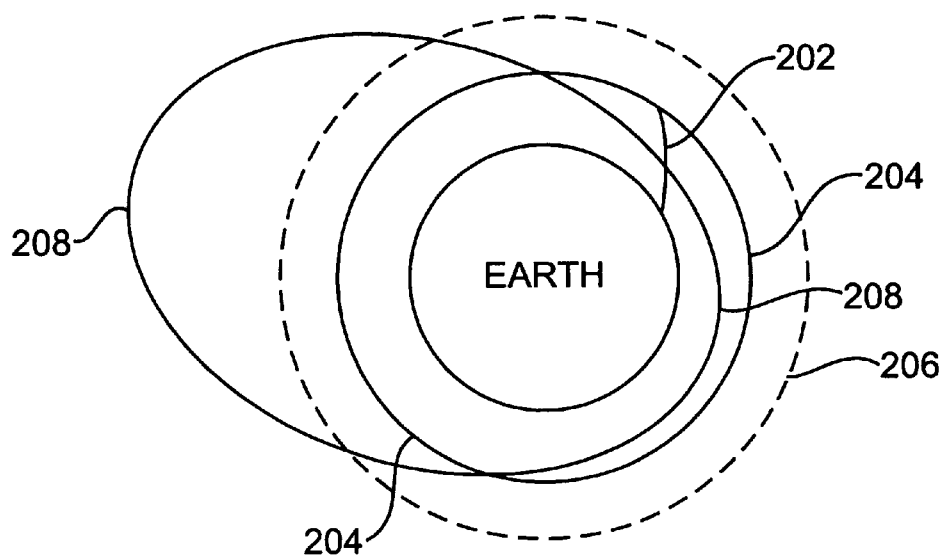
FIG. 2 depicts application of the apogee/perigee filter.

FIG. 2 depicts application of the apogee-perigee filter. The apogee-perigee filter is used to eliminate candidate objects whose altitudes do not come within a given range of the altitude of the primary object. Launch trajectory 202, carries the primary object into Earth orbit 204. The altitude of filtered close approach candidate 206 does not come within the specified minimum range of Earth orbit 204 of the primary object and is therefore filtered out of consideration. By contrast, the altitude of accepted close approach candidate 208 comes within the specified minimum range of Earth orbit 204 of the primary object; in fact, the two objects overlap in altitude. Accordingly, close approach candidate 208 is accepted for further processing.

Figure 3:
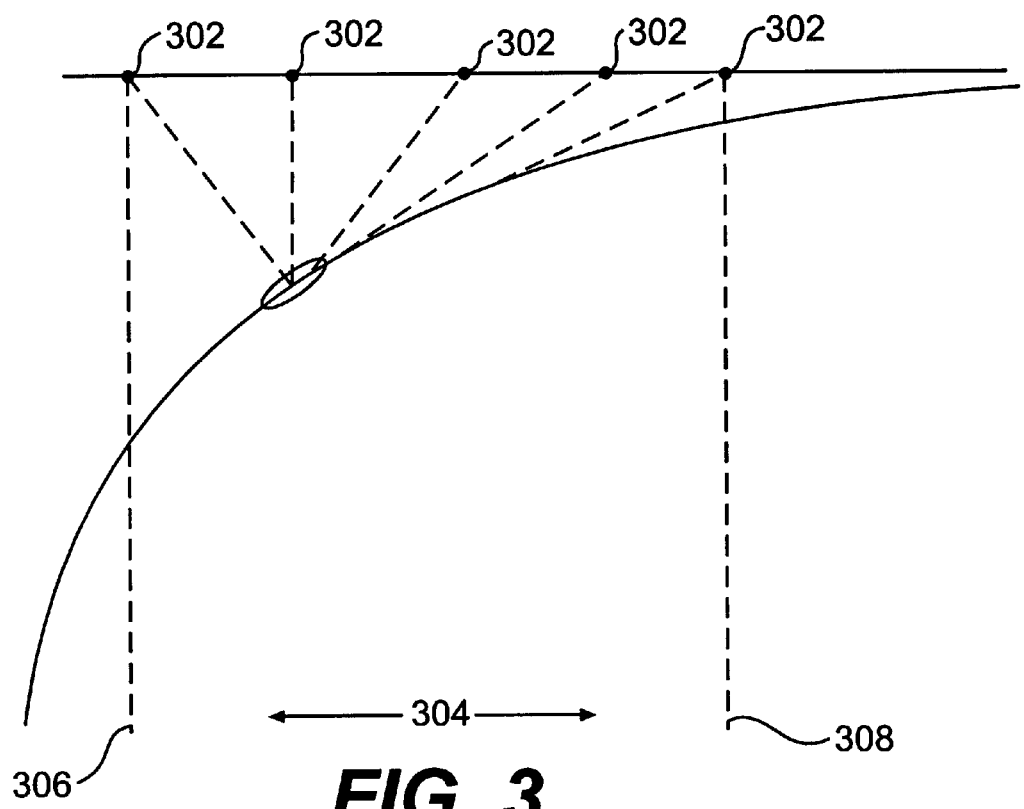
FIG. 3 illustrates Earth-Centered Earth-Fixed trajectory for a candidate object over the launch window.

FIG. 3 illustrates ECEF trajectory for a candidate object over the launch window. Here, the position of the accepted candidate is computed in the ECEF coordinate system at a series of launch times 302 throughout launch window 304, including launch window start 306 and launch window end 308.

Figure 4:
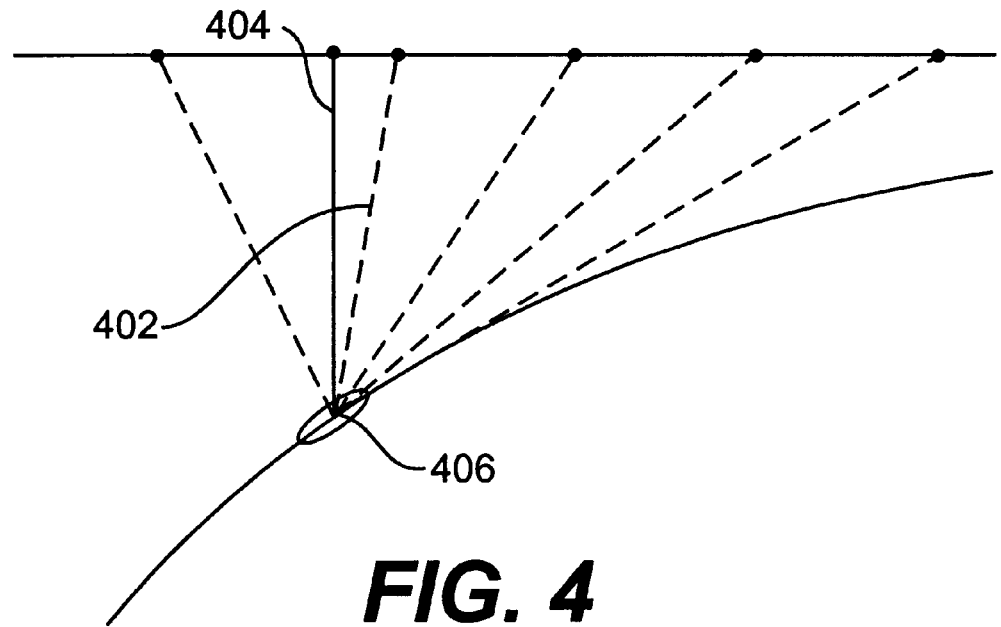
FIG. 4 depicts minimum possible range at a specific time past launch.

FIG. 4 illustrates a minimum possible range at a specific time past time of launch. Minimum possible range 402 is determined between accepted candidate 404 and launch vehicle 406.

Figure 5:
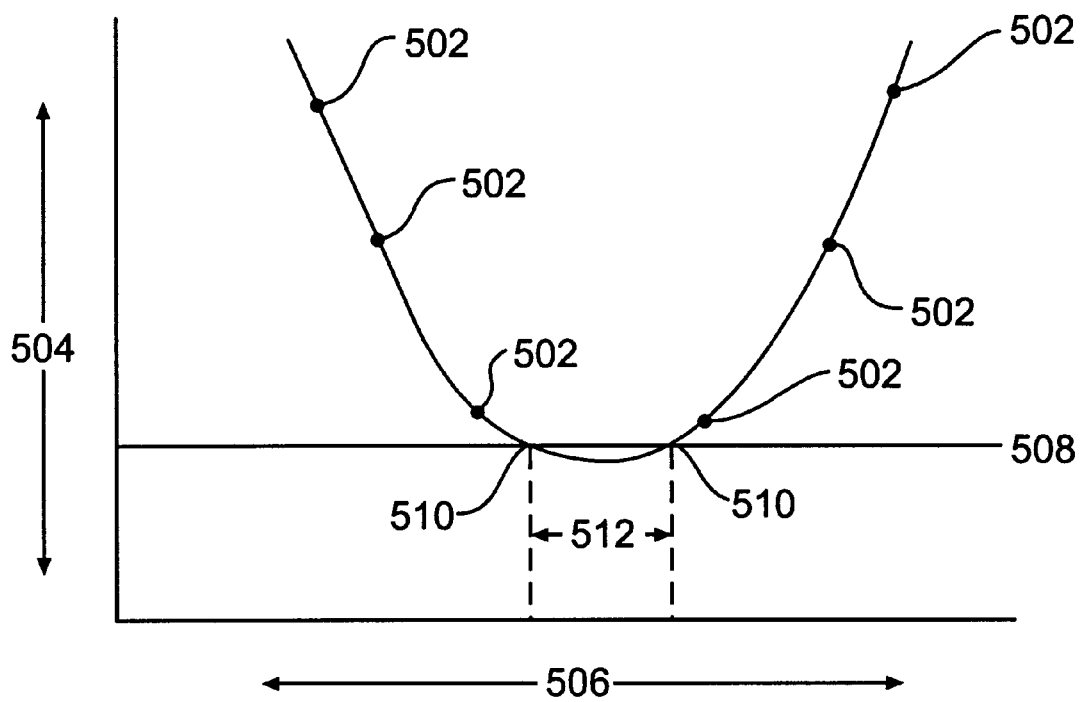
FIG. 5 depicts a situation where an extremum is needed for threshold crossing determination.

FIG. 5 depicts a situation where an extremum is needed for threshold crossing determination. Here, samples 502 of minimum possible range 504 are plotted as a function of MET 506. Extrema are computed and tested against threshold 508, between crossing time 510 where the slope of minimum possible range 504 between the two objects with respect to MET 506 changes from negative to positive 512. The lowest value of minimum possible range 504 is determined within each violation interval. This yields the closest possible approach for each violation interval. The solution for the closest possible approach also yields MET 506 when the closest possible approach will occur and the corresponding time of launch is during the launch window.

Figure 6:
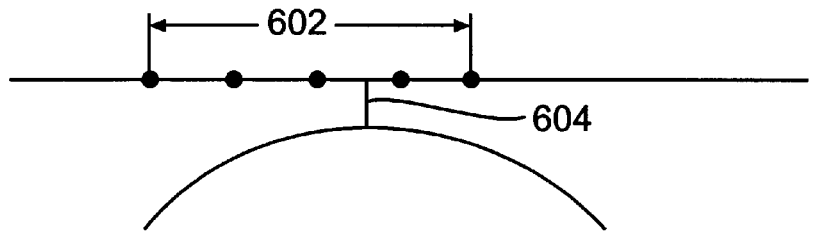
FIG. 6 illustrates the relationship between the time of launch and Mission Elapsed Time for the closest possible approach.

FIG. 6 illustrates the relationship between the time of launch and MET for the closest possible approach. To determine the time within launch window 602 that corresponds with closest approach 604 the solution of the corresponding minimum possible range is examined. This involves the computation of time within the launch window that corresponds to the minimum range between the two objects. Through this process it is possible to determine which objects in the space catalogue have close approaches with the launch vehicle. The start and end of the possible conjunction periods are computed in MET. The time of the closest possible approach to each close approach object is computed in MET and is then mapped back into the launch window to give the corresponding time of launch. Conjunction intervals are mapped back to the launch window to yield blackout periods. These periods correspond to launch times that would result in unacceptable conjunctions between the launch vehicle and other orbiting objects.

Figure 7:
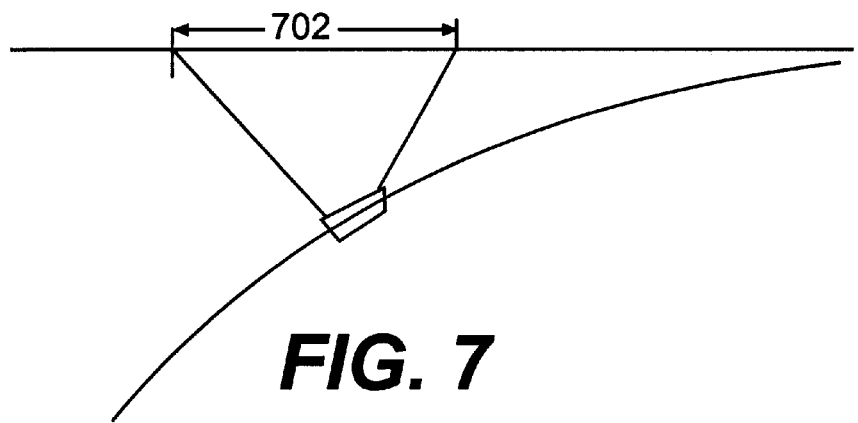
FIG. 7 illustrates how a single Mission Elapsed Time maps to a range of possible launch times.

FIG. 7 illustrates how a single MET within the conjunction interval corresponds to range of possible launch times 702. The conjunction interval is defined as the period of time when the two objects are closer the specified threshold 704. The relationship between the boundaries of the launch window blackout periods and the conjunction intervals in MET is complicated due to this lack of a one to one relationship between MET and time of launch during a conjunction.

Only the end points of the conjunction interval have a one to one mapping into launch window blackout times. It is possible to use the mappings of the end points of the conjunction intervals to produce the launch window blackout periods, but this practice can yield blackout periods that are too small. To achieve the correct bounds on the blackout periods it is necessary to sample the times computed from the threshold crossing algorithm for the start and end points of the blackout periods and compute the extrema of their values. It is especially important to sample points close to the boundaries of the conjunction interval due to the shape of the function.

Figure 8:
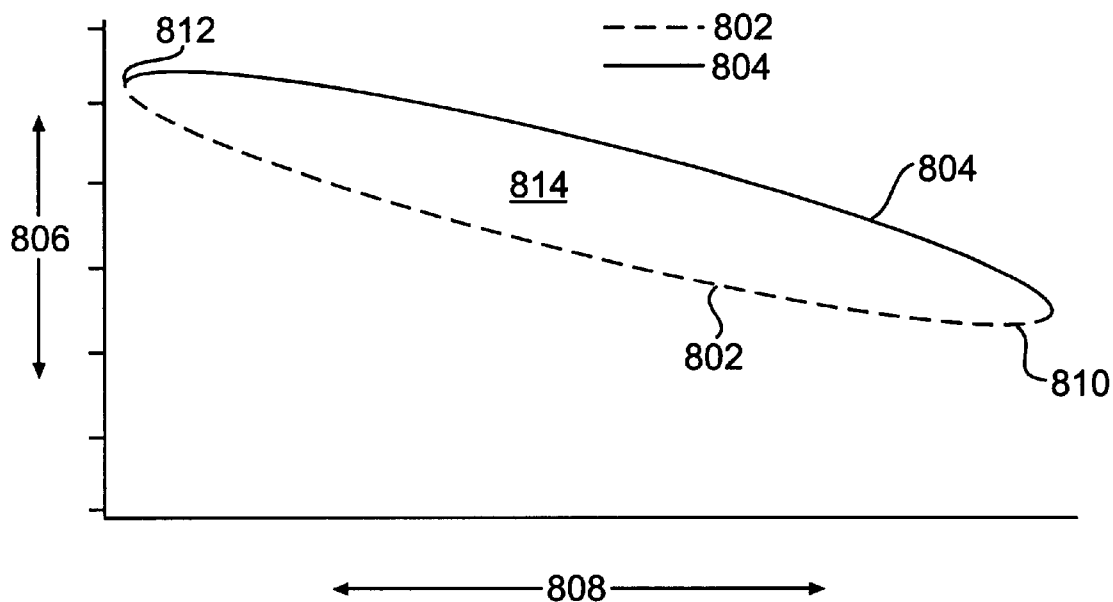
FIG. 8 illustrates launch window blackout periods.

FIG. 8 illustrates launch window blackout periods. Black out start times 802 and black out end times 804 are shown as a function of time within launch window 806 and MET inside conjunction interval 808. The minimum of the blackout start times 810 and the maximum of the blackout end times 812 define the overall launch window blackout interval 814.

In a typical application of the method that is the subject of the present invention, a launch trajectory spanning six hours was generated starting in Florida and inserting a satellite into an orbit. The launch window extended from Feb. 9, 1998 00:00:00 GMT to Feb. 9, 1998 00:30:00. A version of the space catalogue containing orbital elements with epochs on Jan. 23, 1998 was used as the source of initial conditions for the candidate close approach objects. Of the 8050 sets of initial conditions which were read in from the database, 2471 sets remained after the application of the apogee/perigee filter. From the remaining satellites, 39 had potential approaches within 5 Km of the launch vehicle depending upon the time of launch. Launch window blackout periods as small as 0.3 seconds were detected by this new algorithm. Normal close approach analyses were then conducted using selected times throughout the launch window for the start of the trajectory. The results of these test cases agree with the launch window blackout results. In this case, the processing time for the new algorithm was about 30 times as long as the processing time for a single run of the traditional method. However, when the number of traditional runs required to achieve the same level of accuracy (30 min×60 sec/min+0.3 sec=6000) is considered, the new method provides a speed improvement of a factor of 200. This in turn provides for a more complete analysis of all of the potential vehicles which could inhibit a launch time.

Figure 9:
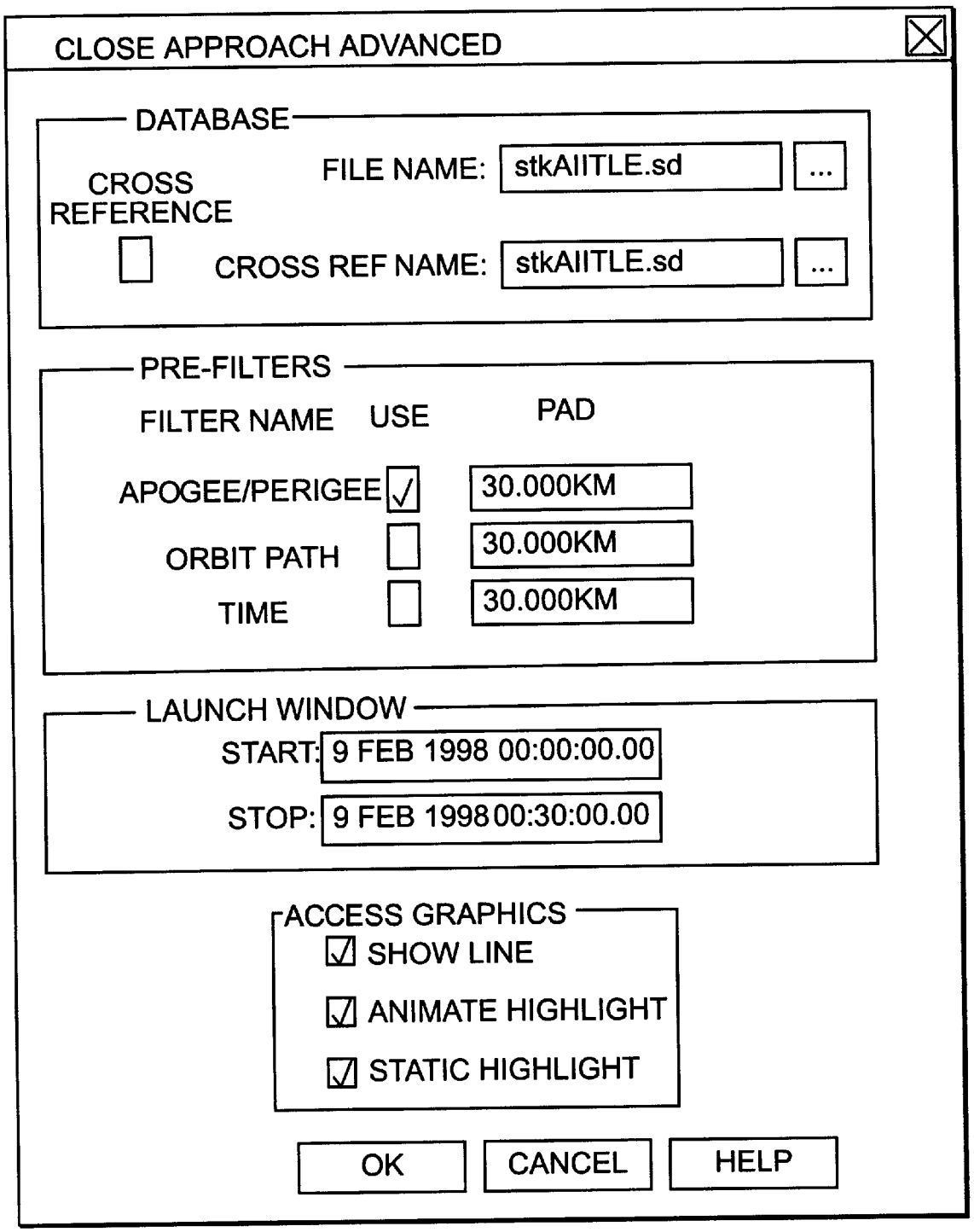
FIG. 9 illustrates a computer interface for entry of launch window and related data.

FIG. 9 illustrates a computer interface for entry of launch window and related data. In its preferred embodiment, the above-described method is used in conjunction with existing computer software for satellite system modeling. For example, a Close Approach Tool (CAT) available as an add-on module to Satellite Tool Kit (STK), produced by Analytical Graphics, Inc., of Malvern, Pa., provides the user with, among other things, fields for the entry of beginning and end times of the launch window.

FIG. 10 illustrates a computer generated launch window blackouts report. Utilizing the method and apparatus described above, and drawing upon its satellite databases and user-entered trajectory parameters, the program computes close approaches and establishes blackout periods. The results are displayed to the user in, among other things, reports giving the beginning and end times and durations of the blackout periods with respect to each close approach object.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but are not expressly stated herein. These modifications, alterations and improvements are intended to be suggested hereby, and within the scope of the invention. Accordingly, the invention is limited only by the following claims and equivalents thereto.

What is claimed is:

1. A method for determining acceptable launch windows to minimize close approaches between a launch vehicle having a launch vehicle trajectory, and a plurality of orbiting objects comprising:

determining whether the orbiting objects can have a close approach with the launch vehicle;

computing start and end of possible conjunction periods;

computing time of closest possible approach, for each orbiting object that can have a close approach with the launch vehicle in mission elapsed time;

mapping the time of the closest possible approach into a planned launch window;

determining time of launch corresponding with the time of the closest possible approach;

mapping conjunction intervals into the planned launch window to yield blackout periods; and choosing the acceptable launch windows.

2. The method for determining acceptable launch windows to minimize close approaches between a launch vehicle having a trajectory, and a plurality of orbiting objects according to claim 1, where determining whether the orbiting objects can have a close approach with the launch vehicle further comprises:

generating an ephemeris for the launch vehicle;

storing the ephemeris;

applying apogee-perigee filter to the launch vehicle and the orbiting objects;

determining a minimum possible range between the launch vehicle and each of the orbiting objects along the launch vehicle trajectory;

applying a threshold-crossing detection algorithm to at least one sampled value of the minimum possible range;

determining an extremum solution;

nesting the extremum solution within the threshold crossing algorithm;

determining the closest possible approach within each close approach interval; and determining the launch window time that corresponds to the closest possible approach within each close approach interval.

3. The method for determining acceptable launch windows to minimize close approaches between a launch vehicle having a trajectory, and a plurality of orbiting objects according to claim 1, wherein determining the minimum possible range further comprises:

sampling the range between the launch vehicle and the orbiting objects based on ephemeris referenced to an Earth-Centered Earth-Fixed coordinate system.

4. The method for determining acceptable launch windows to minimize close approaches between a launch vehicle having a trajectory, and a plurality of orbiting objects according to claim 1, wherein the method is used in conjunction with existing computer software for satellite system modeling.

5. The method for determining acceptable launch windows to minimize close approaches between a launch vehicle having a trajectory, and a plurality of orbiting objects according to claim 4, wherein the method is implemented with an add-on module to the existing computer software for satellite system modeling.

6. The method for determining acceptable launch windows to minimize close approaches between a launch vehicle having a trajectory, and a plurality of orbiting objects according to claim 2, wherein the time reference for the ephemeris is in mission elapsed time.

7. The method for determining acceptable launch windows to minimize close approaches between a launch vehicle having a trajectory, and a plurality of orbiting objects according to claim 2, wherein the position reference frame for the ephemeris is Earth-centered Earth-fixed.

8. The method for determining acceptable launch windows to minimize close approaches between a launch vehicle having a trajectory, and a plurality of orbiting objects according to claim 1, wherein the launch window is shorter than a period of each of the plurality of orbiting objects.

9. The method for determining acceptable launch windows to minimize close approaches between a launch vehicle having a trajectory, and a plurality of orbiting objects according to claim 4, wherein information on the orbiting objects is supplied by a satellite database associated with the existing computer software for satellite system modeling.

10. The method for determining acceptable launch windows to minimize close approaches between a launch vehicle having a trajectory, and a plurality of orbiting objects according to claim 1, wherein times of closest possible approach are computed using an extremum solution algorithm.

11. The method for determining acceptable launch windows to minimize close approaches between a launch vehicle having a trajectory, and a plurality of orbiting objects according to claim 1, wherein information on the orbiting objects is supplied by a satellite database.

12. The method for determining acceptable launch windows to minimize close approaches between a launch vehicle having a trajectory, and a plurality of orbiting objects according to claim 1, further comprising:

generating a launch window blackouts report.

13. The method for determining acceptable launch windows to minimize close approaches between a launch vehicle having a trajectory, and a plurality of orbiting objects according to claim 12, wherein the launch window blackouts report includes beginning and end times and durations of the blackout periods with respect to each orbiting object that can have a close approach.

14. A method for determining acceptable launch windows to minimize close approaches between a launch vehicle having a launch vehicle trajectory, and at least one orbiting object comprising:

generating and storing only a single ephemeris for the launch vehicle;

determining whether the orbiting object can have a close approach with the launch vehicle based on the single ephemeris;

computing start and end of possible conjunction periods based on the single ephemeris;

computing time of closest possible approach for each orbiting object that can have a close approach with the launch vehicle in mission elapsed time;

mapping the time of the closest possible approach into a planned launch window;

determining time of launch corresponding with the time of the closest possible approach;

mapping conjunction intervals into the planned launch window to yield blackout periods; and choosing the acceptable launch windows.

15. The method for determining acceptable launch windows to minimize close approaches between a launch vehicle having a trajectory, and at least one orbiting object according to claim 14, where determining whether the orbiting object can have a close approach with the launch vehicle further comprises:

applying apogee-perigee filter to the launch vehicle and the orbiting object;

determining a minimum possible range between the launch vehicle and the orbiting object at at least one point along the launch vehicle trajectory;

applying a threshold-crossing detection algorithm to at least one sampled value of the minimum possible range;

determining an extremum solution;

nesting the extremum solution within the threshold crossing algorithm;

determining the closest possible approach within each close approach interval; and determining the launch window time that corresponds to the closest possible approach within each close approach interval.

16. The method for determining acceptable launch windows to minimize close approaches between a launch vehicle having a trajectory, and at least one orbiting object according to claim 14, wherein determining the minimum possible range further comprises:

sampling the range between the launch vehicle and the orbiting object based on the ephemeris referenced to an Earth-Centered Earth-Fixed coordinate system.

17. The method for determining acceptable launch windows to minimize close approaches between a launch vehicle having a trajectory, and at least one orbiting object according to claim 14, wherein the method is used in conjunction with existing computer software for satellite system modeling.

18. The method for determining acceptable launch windows to minimize close approaches between a launch vehicle having a trajectory, and at least one orbiting object according to claim 17, wherein the method is implemented with an add-on module to the existing computer software for satellite system modeling.

19. The method for determining acceptable launch windows to minimize close approaches between a launch vehicle having a trajectory, and at least one orbiting object according to claim 14, wherein the time reference for the ephemeris is in mission elapsed time.

20. The method for determining acceptable launch windows to minimize close approaches between a launch vehicle having a trajectory, and at least one orbiting object according to claim 14, wherein the position reference frame for the ephemeris is Earth-centered Earth-fixed.

21. The method for determining acceptable launch windows to minimize close approaches between a launch vehicle having a trajectory, and at least one orbiting object according to claim 14, wherein the launch window is shorter than a period of the at least one orbiting object.

22. The method for determining acceptable launch windows to minimize close approaches between a launch vehicle having a trajectory, and at least one orbiting object according to claim 17, wherein information on the at least one orbiting object is supplied by a satellite database associated with the existing computer software for satellite system modeling.

23. The method for determining acceptable launch windows to minimize close approaches between a launch vehicle having a trajectory, and at least one orbiting object according to claim 14, wherein times of closest possible approach are computed using an extremum solution algorithm.

24. The method for determining acceptable launch windows to minimize close approaches between a launch vehicle having a trajectory, and at least one orbiting object according to claim 14, wherein information on the at least one orbiting object is supplied by a satellite database.

25. The method for determining acceptable launch windows to minimize close approaches between a launch vehicle having a trajectory, and at least one orbiting object according to claim 14, further comprising:

generating a launch window blackouts report.

26. The method for determining acceptable launch windows to minimize close approaches between a launch vehicle having a trajectory, and at least one orbiting object according to claim 25, wherein the launch window blackouts report includes beginning and end times and durations of the blackout periods with respect to each orbiting object that can have a close approach.

* * * * *